United States Patent
Misawa et al.

(10) Patent No.: US 6,560,402 B1
(45) Date of Patent: May 6, 2003

(54) VIDEO RECORDING MEDIUM, VIDEO RECORDING APPARATUS AND VIDEO RETRIEVING METHOD

(75) Inventors: Ikuo Misawa, Ikoma (JP); Hirokazu Ueyama, Woodland Hills, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/275,890

(22) Filed: Mar. 25, 1999

(30) Foreign Application Priority Data

Mar. 27, 1998 (JP) .......................... 10-080861

(51) Int. Cl.[7] .............................. H04N 5/91
(52) U.S. Cl. .................................. 386/69; 386/81
(58) Field of Search ...................... 386/45, 68, 70, 386/81–83, 95, 105–106, 125–126; 360/78.02, 78.03, 84–85, 90–95, 134

(56) References Cited

U.S. PATENT DOCUMENTS 5,541,738 A * 7/1996 Mankovitz .................. 386/83
5,546,191 A * 8/1996 Hibi et al. .................. 386/95
6,141,485 A * 10/2000 Shinohara et al. .......... 386/95
6,229,952 B1 * 5/2001 Nonomura et al. ......... 386/126

FOREIGN PATENT DOCUMENTS

| EP | 0 554 078 A1 | 8/1993 |
| EP | 0 696 798 A1 | 2/1996 |
| EP | 0 827 147 A2 | 3/1998 |
| JP | 06243665 | 2/1994 |
| WO | WO 92/05504 | 4/1992 |

* cited by examiner

*Primary Examiner*—Thai Tran
*Assistant Examiner*—Christopher Onuaku
(74) *Attorney, Agent, or Firm*—McDermott, Will & Emery

(57) ABSTRACT

A video recording medium comprising a first region for recording plural video scenes, and a second region for recording representative images of each scene of the plural video scenes as picture contents, in which picture contents retrieval information for retrieving the picture contents is recorded in the second region or in a third region provided in the vicinity thereof, which is proposed together with a video recording medium and video retrieving method capable of retrieving at high speed by searching the picture contents retrieval information.

10 Claims, 4 Drawing Sheets

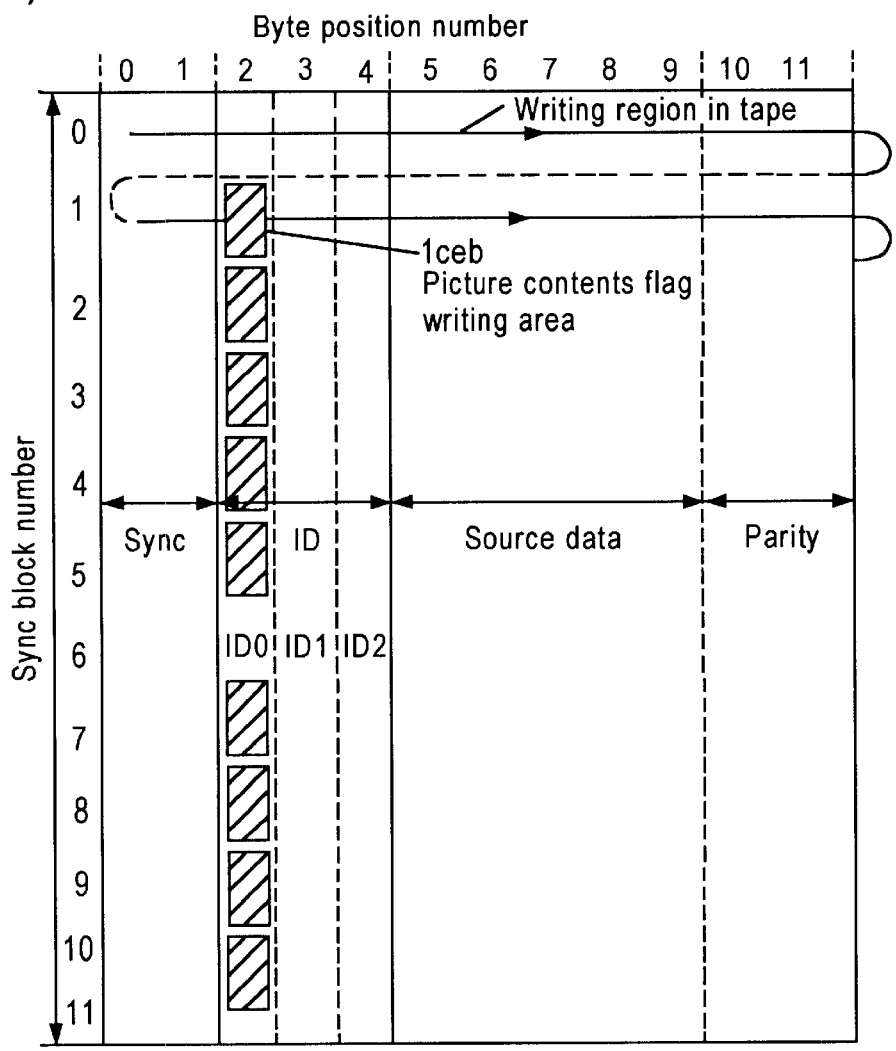

VIDEO RECORDING MEDIUM, VIDEO RECORDING APPARATUS AND VIDEO RETRIEVING METHOD

FIELD OF THE INVENTION

The present invention relates to a video recording medium having a video recording region for recording images continuously and a picture contents recording region for recording picture representing the images as picture contents, a video retrieving method for retrieving the picture contents recording region of the video recording medium, and a video recording apparatus for recording ordinary images and picture contents in such recording medium.

BACKGROUND OF THE INVENTION

Hitherto, a video recording medium, a video recording apparatus, and a video retrieving apparatus are disclosed, for example, in Japanese Laid-open Patent No. 6-243665.

FIG. 4(a) shows a structure of a conventional video recording medium, which comprises a body region (first region) for recording plural events, and a contents region (second region) for recording representative images of individual events together as picture contents. Herein, events are synonymous to scenes. For example, in news gathering or drama taking, it is common to take plural events (scenes) consisting of a series of related images as one event (scene) each, and events are sequentially recorded in a magnetic tape.

In order to identify the taken scene at a glance at the editing stage after filming, it has been proposed to record a representative image of each scene as picture contents at a specified position (at the beginning of a magnetic tape or at the end of a recorded image) of a tape (an example of recording picture contents at the beginning of a magnetic tape is proposed in the cited prior art). Accordingly, at the editing stage, the representative image of each scene (picture contents) can be recognized instantly on the screen, and the editing efficiency is enhanced.

In particular, when finishing the filming, by recording all picture contents at the end of the recorded images, it is possible to identify promptly without having to rewind the magnetic tape to the beginning, and therefore it is a general practice to record the picture contents at the end of the recorded images.

In such video recording medium, video recording apparatus, and video retrieving apparatus, when the magnetic tape is kept at the position of recording the picture contents at the end of the recorded images after filming, the picture contents appear on the screen only by slightly rewinding and reproducing, and the picture contents can be checked immediately, but when the tape is fast forwarded or rewound after recording the picture contents, the recorded position of the picture contents is deviated, and it is required to reproduce and search from the beginning again, which takes much time and labor.

SUMMARY OF THE INVENTION

It is hence an object of the invention to search the recorded position of picture contents in the recording medium quickly and efficiently, by recording the picture contents retrieval information for retrieving the picture contents regions in the picture contents recorded region or its neighboring region at every recording of each event (scene), instead of recording them all at the beginning or end of the tape as mentioned above. That is, as shown in FIG. 4(b), when recording every event, the picture contents retrieval information is recorded in the contents region which is the second region or in a third region.

To solve the problem, the video recording medium of the invention comprises a first region for recording plural video scenes, and a second region provided next to the first region for recording a representative image of each scene of the plural video scenes as picture contents, in which picture contents retrieval information for retrieving the picture contents is recorded in the second region or in a third region provided at its vicinity.

Accordingly, a format of a video recording medium capable of retrieving picture contents at high speed is obtained. Also to solve the problem, the video recording apparatus of the invention is constituted to record plural video scenes in a first region, to record a representative image of each scene of the plural video scenes as picture contents in a second region, and to record picture contents retrieval information in the second region or its vicinity. Therefore, by searching the picture contents retrieval information, the picture contents can be retrieved at high speed in the video recording medium.

Further to solve the problem, the video retrieving method of the invention, using a video recording medium which comprises a first region for recording plural video scenes, and a second region for recording a representative image of each scene of the plural video scenes as picture contents, in which picture contents retrieval information for retrieving the picture contents is recorded in the second region or in a third region provided at its vicinity, is intended to find out the recorded position of the picture contents by retrieving the picture contents retrieval information.

It is hence possible to retrieve the picture contents at high speed by searching the picture, contents retrieval information.

(a) Format of magnetic tape (b) Format of subcode region

FIG. 2 is a format diagram showing a video recording medium in an embodiment of the invention.

(a) Format of sync block (b) Format of identification (ID) data

Figure 3:
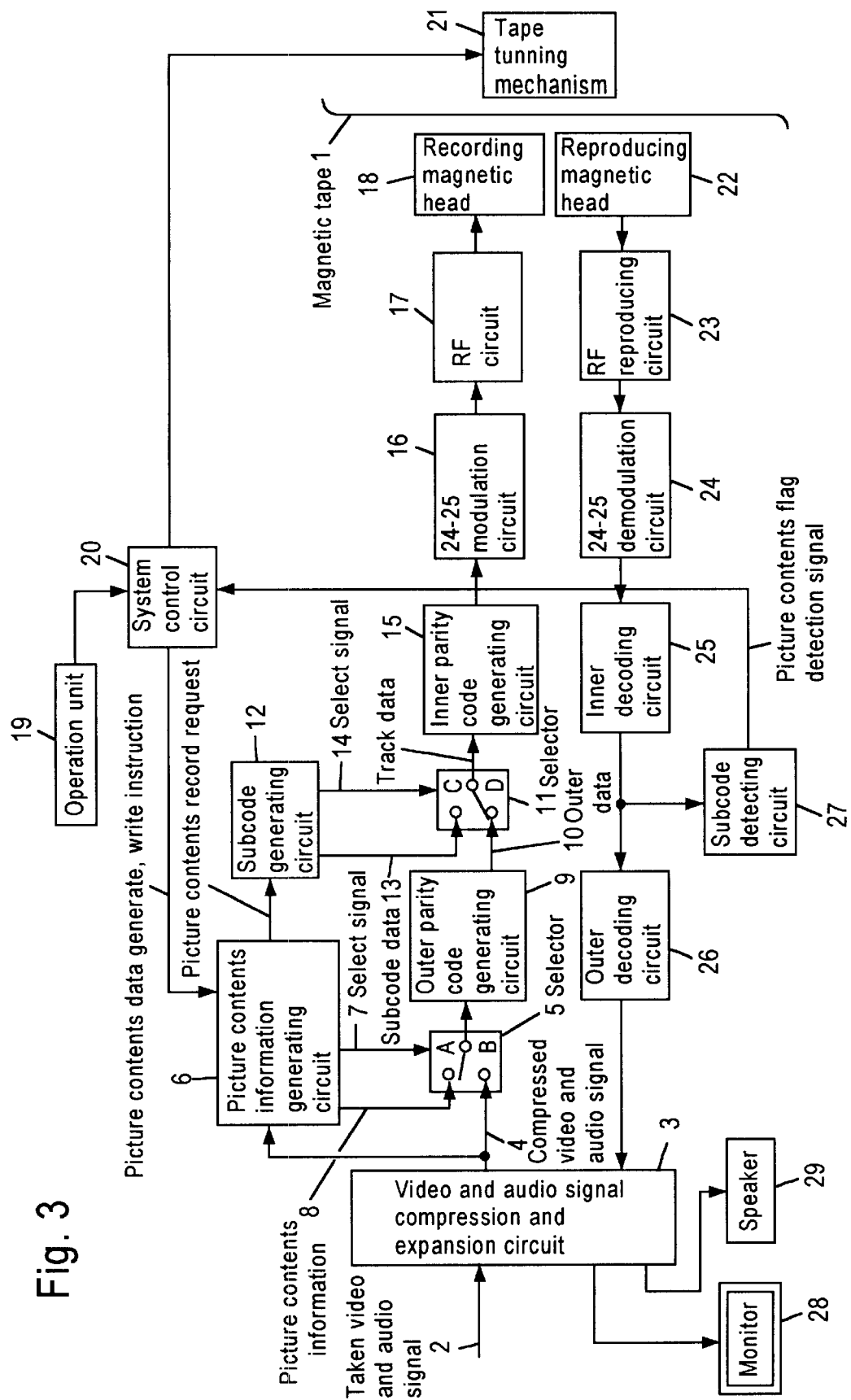

FIG. 3 is a block diagram of a system comprising a video recording apparatus and video retrieving apparatus in an embodiment of the invention.

Figure 4A:
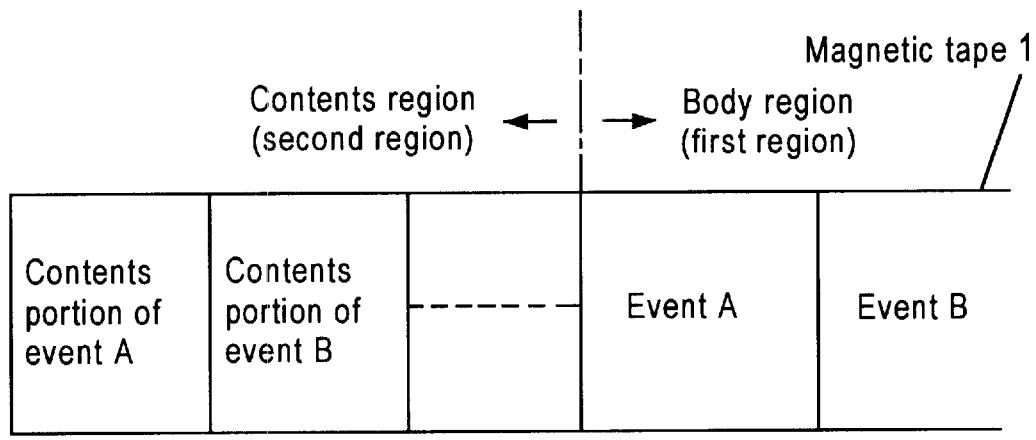

FIG. 4(a) is a block diagram showing a structure of a video recording medium of a prior art.

Figure 4B:
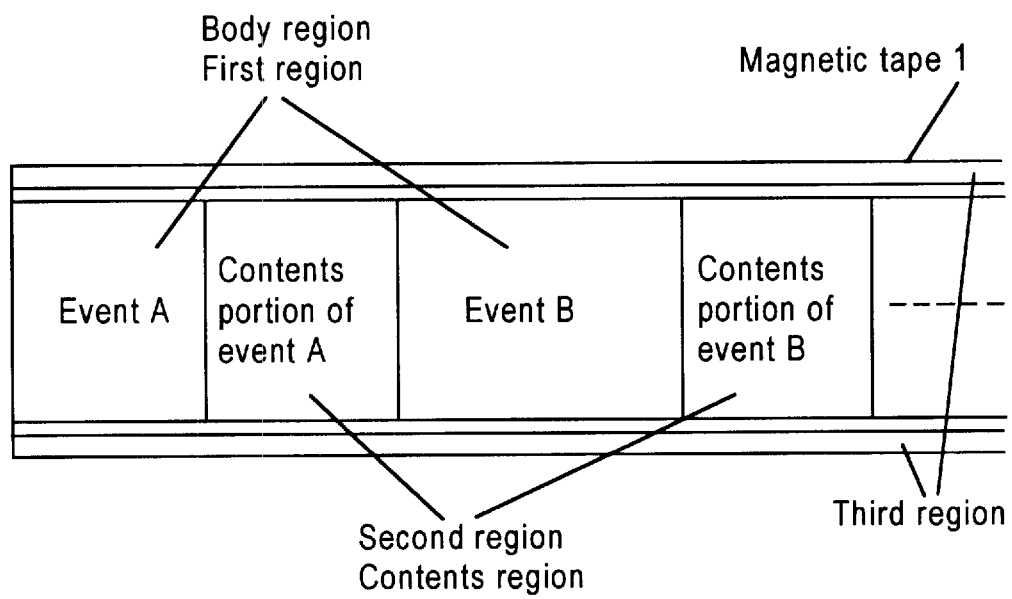

FIG. 4(b) is a block diagram showing a structure of a video recording medium of the invention.

DETAILED DESCRIPTION OF THE INVENTION

In FIG. 1 (a), a magnetic tape 1 has a cue track 1a in the tape running direction, and a control track 1b disposed at both ends of the tape, and a helical track 1c disposed in the center.

The cue track 1a is an optional track for recording a signal as a marker by a fixed magnetic head (not shown) in order to show the recorded position on the tape. Specifically, it includes the SMPTE time code for recording the hour, minute, second and frame of record when filming, and the cue for recording the signal for starting other VTR when dubbing or editing.

The control track 1b is an optional track for recording a signal (control signal) for matching the relation between the reproducing speed of the VTR and the rotating position of a rotary magnetic head with the relation when recording.

The helical track 1c is formed by scanning the magnetic tape 1 helically to the tape running direction by a head (not shown) mounted on a rotary cylinder (not shown).

Figure 1A:
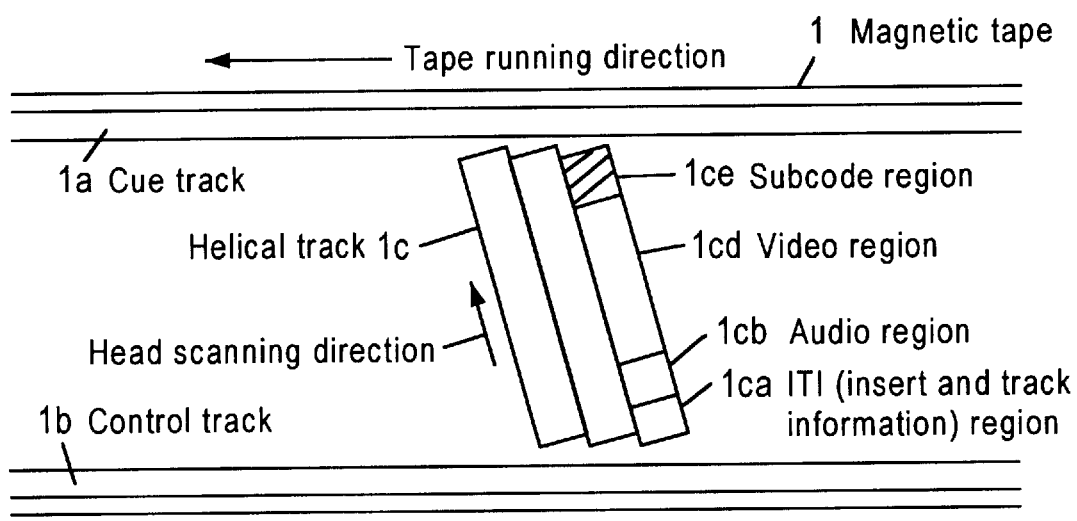
FIG. 1 is a format diagram showing a video recording medium in an embodiment of the invention.

The helical track 1c is formed, for example, as shown in FIG. 1(a), and consists of four regions. First is an insert and track information (ITI) region 1ca (a region for recording information about position of data on the track, track width, data structure, etc.), second is an audio region 1cb, third is a video region 1cd, and fourth is a subcode region 1ce (a region for recording absolute track number, tape beginning information in plural tracks, time code and various ID data repeatedly so as to be capable of identifying if the tape runs at high speed, provided for the purpose of selecting the position in high speed searching or editing). In usual filming, the taken images are recorded sequentially and continuously in the video region 1cd, while the taken sound is recorded sequentially and continuously in the audio region. Corresponding signals are recorded in the ITI region 1ca and subcode region 1ce.

In this embodiment, a picture contents flag (1 bit) as picture contents retrieval information showing whether picture contents are recorded or not is provided plural positions in the subcode region 1ce, and the picture contents or usual continues taken images can be distinguished by the data of the picture contents flag.

Figure 1B:
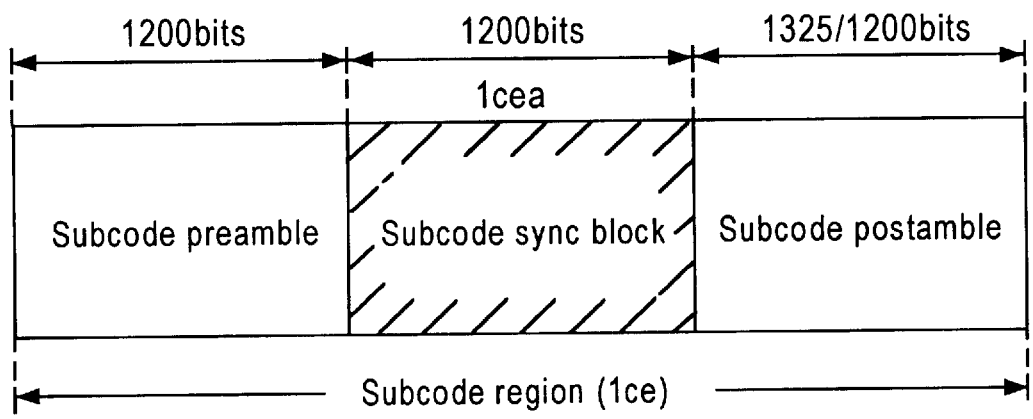

More specifically, the subcode region 1ce on the helical track 1c is composed as shown in FIG. 1(b), and the picture contents flag is contained in a subcode sync block 1cea in the subcode region 1ce.

The subcode sync block 1cea is composed as shown in FIG. 2(c), and the picture contents flag is contained in a shaded area 1ceb in the subcode sync block 1cea.

The shaded area 1ceb in FIG. 2(c) is composed as shown in FIG. 2(d), and the picture contents flag is contained at bit position b6 of 8-bit data. This picture contents flag is "1" in the case of picture contents, and is "0" in the case of usual continuous taken images. By this flag, therefore, the picture contents or the usual continuous taken images can be distinguished. These four regions and the structure of the data recorded therein are same as the structure disclosed in Consumer-Use Digital VCR (Dec. 1994), Part 2 SD Specifications of Consumer-Use Digital VCR, determined by HD Digital VCR Conference.

The shaded area 1ceb in FIG. 2(c) can accommodate up to 10 picture contents flags because it includes sync block numbers 1 to 5, 7 to 10, and ten byte position numbers 2 as shown in FIG. 2(c). Hence, since a plurality of picture contents flags can be recorded in the magnetic tape 1, the probability of finding the picture content flags during retrieval is enhanced, and the retrieval precision is improved.

In FIG. 2(c), moreover, since the writing sequence into the magnetic tape 1 is in the unit of sync blocks (every lateral row in FIG. 2(c)), the picture contents flags are recorded at intervals, and the probability of finding the picture contents flags during retrieval is enhanced, and the retrieval precision is improved, and still more if a reading error occurs due to flaw in the magnetic tape 1, since the picture contents flags are scattered in a broad range, the probability of reading the picture contents flags is enhanced.

Recording and retrieving of picture contents flags are described below while referring to FIG. 3.

A taken video and audio signal 2 is fed into a video and audio compression and expansion circuit 3 to be compressed, and a compressed video and audio signal 4 is sent out into a selector 5 and a picture contents information generating circuit 6. The selector 5 selects either the compressed video and audio signal 4 or picture contents information 8 depending on a select signal 7 from the picture contents information generating circuit 6, and sends it to a next outer parity code generating circuit 9. The outer parity code generating circuit 9 generates an outer parity code from the input signal, and adds a correction code to the input signal, and sends it as outer data 10 to a selector 11.

The selector 11 selects either outer data 10 or subcode data 13 depending on a select signal 14 from a subcode generating circuit 12, and sends it as track data to a next inner parity code generating circuit 15.

The inner parity code generating circuit 15 generates an inner parity code from the input track data, and adds the correction code to the input track data and sends out to a 24–25 modulation circuit 16.

The 24–25 modulation circuit 16 generates a low frequency pilot component by inserting an extra bit (1 bit) in every unit of 24 bits for data row of input signals, and obtains a low frequency pilot signal when reproducing, and modulates by 24–25 and transmits to an RF circuit 17 so as to be useful for tracking control (explanation omitted) for controlling the reproducing speed of the VTR so that the rotary magnetic head may follow up the helical track which is a recorded signal track when reproducing, and a recorded signal is generated in the RF circuit 17, and is recorded in the magnetic tape 1 by a recording magnetic head 18.

A system control circuit 20 controls a tape running mechanism 21 or picture contents information generating circuit 6 on the basis of the instruction from an operation unit 19 for start of recording, end of recording, retrieval of picture contents, etc. The picture contents information generating circuit 6 generates, on the basis of the instruction from the system control circuit 20, picture contents information from the compressed video and audio signal 4 in the case of instruction of picture contents data generation, or supplies, in the case of instruction of picture contents data writing, the generated picture contents information to the selector 5, and changes the select signal 7 to the picture contents information 8 side, and sends the picture contents record request to the subcode generating circuit 12. The subcode generating circuit 12, while the picture contents record request is coming, generates "0" in bit 6 of the ID0 of the subcode sync block in the subcode region, and controls, in the case of the subcode region 1ce of the helical track, the select signal 14 so that the selector 11 may be changed over to the subcode data 13 side. Therefore, the subcode generating circuit 12 may be called picture contents retrieval information generating circuit means.

In the reproducing system, by the instruction of the system control means 20, the tape running mechanism 21 is driven, and in the reverse procedure of the recording system operation mentioned above, the picture is supplied into a monitor 28 which is display means and the sound is sent into a speaker 29 to be seen and heard, in the route of reproducing magnetic head 22, RF reproducing circuit 23, 24–25 demodulating circuit, inner decoding circuit 25, outer decoding circuit 26, and video and audio compression and expansion circuit 3.

In the case of picture contents retrieval, during high speed feed of magnetic tape 1, the data in the subcode indicating the picture contents region is detected by a subcode detecting circuit 27, and is sent into the system control circuit 20, and therefore the subcode detecting circuit 27 may be called a picture contents retrieval information detecting circuit. The embodiment thus constituted is specifically described below.

First, the video recording operation is described.

When a record start button in the operation unit 19 is pressed, and filming of a first scene is started, the taken video and audio signal 2 taken by the camera unit not shown in the drawing is fed into the video and audio compression and expansion circuit 3, and the system control circuit 20 control the tape running mechanism 21 to start control of tape running. Since this case is recording, the tape running is controlled so as to be an ordinary speed (single speed).

Of the taken video and audio signal 2, only the video signal is compressed in the video and audio compression and expansion circuit 3. In the case of this embodiment, the video signal is compressed by the DV compression of the same structure as the compression in the DV format disclosed in the Consumer-Use Digital VCR, Part 2, mentioned above. After the video signal is compressed, the compressed video and audio signal 4 is supplied into the selector 5. The selector 5 is connected to the B side in the case of usual continuous filming state. Accordingly, the compressed video and audio signal 4 is supplied into the selector 11 as outer data 10 after a correction code is generated and added by the outer parity code generating circuit 9. The selector 11 is connected to the D side in the case of usual continuous filming. Therefore, the outer data 10 is fed into the inner parity code generating circuit 15 as track data, and a correction code is generated and added in the inner parity code generating circuit 15, and it is recorded in the magnetic tape 1 through the 24–25 modulation circuit 16, RF circuit 17 and recording magnetic head 18.

The system control means 20, several seconds after start of recording, sends an instruction for generation of picture contents data to the picture contents information generating circuit 6. The picture contents information generating circuit 6 generates picture contents information from the compressed video and audio signal 4, and accumulates in the memory (not shown) in the picture contents information generating circuit 6.

After filming of the first scene is over, when a stop button in the operation unit 19 is pressed, the system control circuit 20 stops running of the magnetic tape 1. Thereafter, same as in filming of the first scene, filming of second scene, third scene, and so forth continues, and the video and audio signal of each scene is sequentially recorded in the magnetic tape 1, and one picture in several seconds after start of filming of each scene is accumulated as picture contents data in the memory in the picture contents information generating circuit 6. Incidentally, writing instruction into the picture contents information generating circuit (memory) 6 of the picture contents information may be given by the operator by pushbutton operation, but in order to avoid error of instruction failure or the like, it is preferred to generate by setting the timer in several seconds after the record start button is pressed.

At the end of filming, by pressing a finish button or an eject button for taking out the magnetic tape in the operation unit 19, the picture contents information 8 in the picture contents information generating circuit 6 is recorded in the magnetic tape 1. By pressing the finish button or eject button for taking out the magnetic tape in the operation unit 19, the system control circuit 20 control the tape running mechanism 21 to start control of tape running. Since this case is recording, the tape running speed is controlled to be usual speed (single speed). Consequently, the system control circuit 20 sends an instruction of picture contents data writing to the picture contents information generating circuit 6. The picture contents information generating circuit 6 receives the instruction of picture contents data writing from the system control circuit 20, and sends a picture contents record request to the subcode generating circuit 12, and changes over the select signal 7 to the A side select, then issues plural pieces of video data of the picture contents information accumulated in the memory into the selector 5 one by one. The picture contents information 8 is combined with a correction code which is generated in the outer parity code generating circuit 9, and the correction code is generated and added in the inner parity code generating circuit 15, and it is recorded in the magnetic tape 1 through the 24–25 modulation circuit 16, RF circuit 17, and recording magnetic head 18.

In the case of this embodiment, since one picture is recorded in 10 helical tracks 1c shown in FIG. 1(a), when a picture of one track portion is recorded in the video region led, the next select signal 14 is changed, and the selector 11 is connected to the C side, and the subcode data 13 including the picture contents flag is recorded in the subcode region 1ce. In this case, in the subcode generating circuit 12 for recording picture contents data, the subcode data 13 including the picture contents flag=0 (picture contents recording region) is generated, and this subcode data 13 is recorded in the subcode region 1ce of the magnetic tape 1.

In the case of a second helical track, the circuit operation is same as in the first case, and after recording the picture contents information of one track portion (one-tenth of a picture) in the video region 1cd of the magnetic tape 1 in the route of picture contents information generating circuit 6, selector 5, outer parity code generating circuit 9, selector 11, and inner parity code generating circuit 15, the subcode data 13 including the picture contents flag=0 (picture contents recording region) is recorded in the subcode region 1ce of the magnetic tape 1 in the route of subcode generating circuit 12, selector 11 and inner parity code generating circuit 15.

Thereafter, recording similarly up to the tenth helical track, the picture contents flag is recorded as picture contents retrieval information for retrieving the first picture contents data and the picture contents.

The second and subsequent picture contents data are recorded in the magnetic tape 1 in the same process as above, and the subcode data including the picture contents data in the number corresponding to the number of scenes and the picture contents flag=0 is recorded.

In this operation, the picture contents flag as the picture contents retrieval information for retrieving the picture contents is recorded in the helical track 1c which is the picture contents recording region by a plurality (10 pieces) in every track, and 100 picture contents flags are recorded in 10 tracks.

Thus, according to the embodiment, after the region for recording usual plural video scenes, the second region for recording the picture contents is provided, and the picture contents retrieval information is recorded in a subcode region within the second region, so that the video recording medium capable of retrieving the picture contents at high speed is obtained.

The video retrieving operation is described below.

When desired to check the picture contents, the operator presses the picture contents retrieval button in the operation unit 19, so that the system control circuit 20 instructs tape rewinding operation of the magnetic tape 1 to the tape running mechanism 21. During rewinding operation of the magnetic tape 1, since the tape feed speed is fast (several times to hundreds of times of usual reproducing speed regarded as single speed), the reproducing magnetic head 22 can read only part of the data in the helical track 1c because it is intersecting with the helical track 1c, but as explained above, since the picture contents flag is divided and 10 pieces are recorded in the subcode region 1ce of one helical track 1c, and recorded in 10 helical tracks, and therefore the picture contents flags can be read as far as the tape running speed is about 10 times, so that the picture contents flags are read in this embodiment by increasing the tape running speed 10 times.

The picture contents data being read out by the reproducing magnetic head 22 is detected in the subcode detecting circuit 27 in the route of RF reproducing circuit 23, 24–25 demodulation circuit, and inner decoding circuit 25, and when the picture contents flag=0 (picture contents recording region) is detected in the subcode detecting circuit 27, the subcode detecting circuit 27 sends the picture contents flag detection signal to the system control circuit 20, and the system control circuit 20 stops rewinding of the magnetic tape 1, thereby changing to still (still picture reproduction) operation.

Usually, since the picture contents data include additional information such as scene number and time code, in the case of still operation, the picture having the scene number or time code superposed on the image is displayed in the monitor 28.

The operator turns the dial (not shown) of the operation unit 19 while observing the screen of the monitor 28, and moves the still position, and the next picture contents data is displayed. The operator selects the scenes to be used and determines the sequence of scenes on the basis of the picture contents data displayed in the monitor.

Thus, according to the embodiment, by forming the second region for recording the picture contents after the first region for recording usual plural video scenes, it is intended to find out the recorded position of the picture contents of the video recording medium in which the picture contents retrieval information is provided in the subcode region in the second region by retrieving the picture contents retrieval information, so that the picture contents can be retrieved at high speed by searching the picture contents retrieval information.

In embodiment 1, meanwhile, the picture contents retrieval information is provided in the helical track, but the purpose of the invention is also achieved by recording the picture contents retrieval information in a linear track (continuous track) formed as a third region provided at the tape end near the second region for recording the picture contents (cue track or control track in FIG. 1(a)).

Incidentally, as the picture contents retrieval information, in the cue track, by recording an audio signal within an audible range (for example, sine wave at specific frequency, voice memo, etc.), it is possible to retrieve while hearing the voice through the speaker.

In the embodiment, one piece of picture contents is prepared for each scene, but plural representative images may be selected for each scene, and reduced, and plural representative images may be displayed for one piece of picture contents.

The display of picture contents in the monitor 28 is shown in every piece, but various display forms may be possible, such as display by slightly deviating plural pieces of picture contents.

Thus, according to the invention, by recording the picture contents retrieval information for retrieving the picture contents region in the picture contents region or its neighboring region, it brings about a beneficial effect of finding out the location of recording of picture contents in the recording medium at high speed.

What is claimed is:

1. A video recording medium comprising a first region for recording plural video scenes intermittently, and a second region for recording representative video data extracted from said plural video scenes, and picture contents retrieval information for retrieving one of said plural video scenes in said first region formed intermittently.

2. A video recording medium according to claim 1, further comprising a plurality of said first regions and a plurality of said second region, each of said second regions being separated from another one of said second regions by one of said first regions.

3. A video recording medium comprising a first region for recording plural video scenes intermittently, and a second region for recording representative video data extracted from said plural video scenes, and picture contents retrieval information for retrieving one of said plural video scenes in said first region formed intermittently, and a third region disposed near said second region for recording optional audio signal or cue signal.

4. A video recording medium according to claim 3, further comprising a plurality of said first regions and a plurality of said second region, each of said second regions being separated from another one of said second regions by one of said first regions.

5. A video recording medium comprising a first region for recording plural video scenes intermittently, and a second region for recording representative video data extracted from said plural video scenes disposed between the adjacent first regions, and a third region of recording picture contents retrieval information for retrieving one of said plural video scenes disposed near said second region for recording optional audio signal or cue signal.

6. A video recording medium according to claim 5, further comprising a plurality of said first regions and a plurality of said second region, each of said second regions being separated from another one of said second regions by one of said first regions.

7. A video recording apparatus comprising compression and expansion circuit means for compressing and expanding video signals expressing plural video scenes, picture contents information generating circuit means for obtaining picture contents information signal by extracting representative video information in each video scene of said plural video scenes from the compressed video and audio signal obtained from said means, picture contents retrieval information generating circuit means for generating picture contents retrieval information signal showing presence or absence of said picture contents information depending on a picture contents record request signal from said picture contents information generating circuit means, rotary magnetic head means for recording a signal in a magnetic tape, fixed magnetic head means, and tape running means for driving said magnetic tape, wherein said magnetic tape includes a first region for recording said plural video scenes, a second region formed intermittently with said first region, and a third region disposed near said second region for recording optional audio signal or cue signal, and while driving said magnetic tape by said tape running means, said compressed video and audio signal is recorded in said first region by said magnetic head means in said magnetic tape, a representative video data extracted from said plural video scenes and a picture contents information signal being recorded in said second region, and said picture contents retrieval information signal is recorded in said second region.

8. A video recording apparatus comprising compression and expansion circuit means for compressing and expanding video signals expressing plural video scenes, picture contents information generating circuit means for obtaining picture contents information signal by extracting representative video information in each video scene of said plural video scenes from the compressed video and audio signal obtained from said means, picture contents retrieval information generating circuit means for generating picture contents retrieval information signal showing presence or absence of said picture contents information depending on a picture contents record request signal from said picture contents information generating circuit means, rotary magnetic head means for recording a signal in a magnetic tape, fixed magnetic head means, and tape running means for driving said magnetic tape, wherein said magnetic tape includes a first region for recording said plural video scenes, a second region formed intermittently with said first region, and a third region disposed near said second region for recording optional audio signal or cue signal, and while driving said magnetic tape by said tape running means, said compressed video and audio signal is recorded in said first region by said magnetic head means in said magnetic tape, a representative video data extracted from said plural video scenes and a picture contents information signal being recorded in said second region, and said picture contents retrieval information signal is recorded in said third region.

9. A video retrieving method comprising magnetic head means for reproducing recorded signals from a magnetic tape, picture contents retrieval information detecting circuit means for detecting a picture contents retrieval information signal from the signals reproduced by said magnetic head, and tape running means for driving said magnetic tape, wherein said magnetic tape includes a first region for recording said plural video scenes, and a second region for recording a representative video data extracted from said plural video scenes, a picture contents information signal and said picture contents retrieval information signal, said second region being formed intermittently with said first region, and by driving said magnetic tape by said tape running means, the recorded position of the picture contents information recorded in said second region is found out by detecting by said picture contents retrieval information detecting circuit means.

10. A video retrieving method comprising magnetic head means for reproducing recorded signals from a magnetic tape, picture contents retrieval information detecting circuit means for detecting a picture contents retrieval information signal from the signals reproduced by said magnetic head, and tape running means for driving said magnetic tape, wherein said magnetic tape includes a first region for recording said plural video scenes, and a second region for recording a representative video data extracted from said plural video scenes, and a picture contents information signal, said second region being formed intermittently with said first region, and a third region for recording said picture contents retrieval information signal, and by driving said magnetic tape by said tape running means, the recorded position of the picture contents information recorded in said third region is found out by detecting by said picture contents retrieval information detecting circuit means.

* * * * *